April 21, 1964  S. P. PROSEN  3,129,560
CONVECTIVELY COOLED ROCKET NOZZLE
Filed June 13, 1960

INVENTOR.
STANLEY P. PROSEN
BY *W. O. Quesenberry*
*O. E. Hodges*
*R. W. Fournier* ATTYS.

United States Patent Office 3,129,560
Patented Apr. 21, 1964

3,129,560
CONVECTIVELY COOLED ROCKET NOZZLE
Stanley P. Prosen, Lanham, Md., assignor to the United States of America as represented by the Secretary of the Navy
Filed June 13, 1960, Ser. No. 35,851
8 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

This invention relates to rocket nozzles; more specifically it relates to rocket nozzles having provisions for cooling.

Rocket nozzles are usually not cooled at all except in the case of some liquid propellant motors where regenerative type cooling systems are employed. In solid propellant motors, nozzles are usually made of high temperature materials which are erosion-resistant but which ablate to some extent under the action of the hot exhaust gases.

Higher temperatures and mass flows are being experienced in rocket motors and the melting points of some of the high temperature materials which have been used in the past in nozzle construction have already been exceeded.

It is therefore an object of this invention to provide a rocket nozzle which exhibits less ablation than existing ones when used under the same conditions.

Another object is to provide a rocket nozzle which will not show undue ablation when used with some of the more energetic propellants in use today.

Further objects and many of the attendant advantages will be readily appreciated as the same becomes better understood by reference to the following detailed description when considered in connection with the accompanying drawing wherein.

Figure 1:
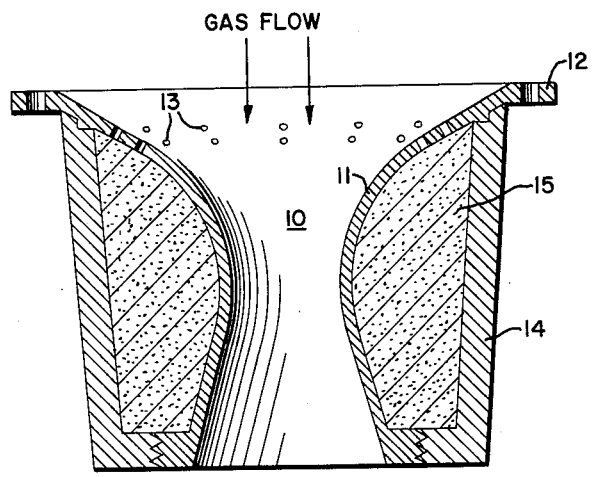
FIG. 1 is a cross-sectional view of a nozzle of the instant type.

Referring now to the drawing wherein like reference characters designate like or corresponding parts throughout the several views, there is shown in FIG. 1, which is the preferred embodiment, the nozzle 10 comprising an inner annular wall 11 which is properly contoured internally according to the requirements of nozzle design, the inlet end of which is adapted to form a flange 12, and having an outwardly raised portion at the discharge end which is threaded longitudinally. Wall 11 is further provided with a multiplicity of circumferentially spaced apertures 13 near the flanged end. Flange 12 has a multiplicity of equi-spaced apertures about its periphery to accommodate bolts to attach the nozzle to a similar flange connected to a rocket motor.

Outer annular wall 14 has an inner raised portion at the discharge end which has longitudinal threads which mate with the threads of wall 11, joining the two walls; the opposite end of wall 14 abuts and is adapted to closely fit wall 11 near its flanged end. A hollow space is formed between walls 11 and 14 and fusible material 15 is positioned therein, substantially occupying the space.

Figure 2:
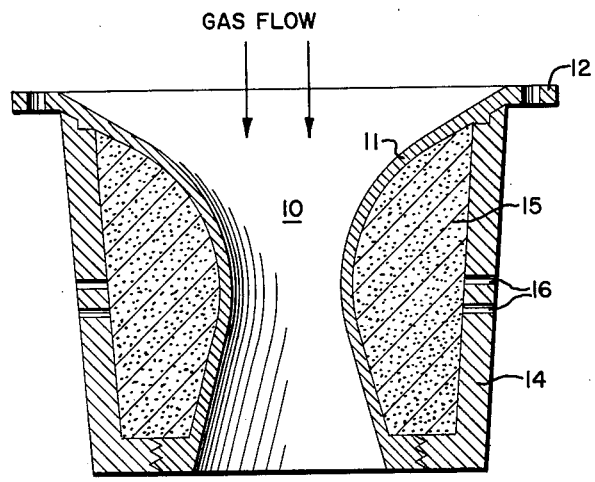
FIG. 2 is a cross-sectional view of another embodiment thereof.

There is shown in FIG. 2 the nozzle of FIG. 1 in which apertures 13 in inner wall 11 have been omitted and a multiplicity of circumferentially spaced apertures 16 have been provided in outer wall 14.

In operation, hot gases flowing into the nozzle rapidly heat inner wall 11 to extremely high temperatures. Such heat is conducted to the fusible material which first melts and then vaporizes. The vapor is forced out of the apertures provided; in the case of the nozzle shown in FIG. 1, the apertures are upstream of the throat of the nozzle and the vapor clings to the boundary of wall 11 and cools it while being swept out of the nozzle by the hotter exhaust gases. In the case of the nozzle shown in FIG. 2, the vapors are simply dissipated to the outside of the nozzle through apertures 16.

The choice of materials is critical and inner wall 11 must be made of at least a fairly high temperature material such as tungsten, or carbides of metals so as to resist ablation to some extent. The outer wall 15, not being attacked by the hot gases, need only to be able to withstand the high temperatures encountered and may be made of a lesser high temperature material such as molybdenum.

Fusible material 15 must have a lower vaporization point than the melting point of the material of wall 11 and in addition must have a high heat capacity, a high melting point, and a high heat of fusion.

For example, a good choice of materials is tungsten for wall 11 and boron as the fusible material 15. Tungsten melts at 6098° F.; boron melts at 4172° F. and vaporizes at 4622° F. which is well below the melting point of tungsten. Boron has a specific heat of 2.65 calories per degree per gram-mole at 25° C.; its heat of fusion 0.4 kilocalories per gram-mole and its heat of vaporization is 137 kilocalories per gram-mole. Thus 14.138 kilocalories of heat per gram are required to raise boron from 25° C. to vaporization; this is equivalent to 35.8 kilocalories of heat per cubic centimeter. All this heat is used up before any of the cooling effect aforementioned for the embodiment of FIG. 1 takes place.

Presented in Table 1 below are some fusible materials which are suitable for use in the present invention along with their thermal properties:

Table 1

| Material | Boiling Point, Degrees Centigrade | Total Heat Required Room Temperature to Vaporization | |
|---|---|---|---|
| | | Kcal./gm. | Kcal./cc. |
| Nickel | 2,730 | 1.922 | 17.120 |
| Antiomony Trioxide | 1,570 | 1.494 | 8.450 |
| Lithium Fluoride | 1,681 | 2.580 | 6.720 |
| Zinc | 907 | 0.523 | 3.730 |
| Iron | 2,735 | 1.885 | 14.800 |
| Alumina | | 5.25 | 21.0 |
| Silica | | 4.60 | 10.58 |

Fusible material 15 may be physically a solid piece of material, a sintered piece of material, or it may be powdered. Additionally the material must be thermally conductive and there must be good contact between the material and wall 11. For good thermal contact however, material 15 must, if solid or sintered, be formed to fit closely the annular space.

Precise machining is required at the point of joinder of walls 11 and 15 near the nozzle entrance so as to form gas tight seals; gaskets cannot be used because of the high temperatures. Precise machining is also obtained between the threaded portions of walls 11 and 15 as a gas tight seal is required.

The nozzle is easily assembled in the case of solid or sintered fusible materials by making the fusible material in two semi-annular pieces, joining the semi-annular pieces about annular member 11 and screwing home annular wall 14. In the case of powdered fusible material, the powder is forced into the annular space through apertures 13 or 16, as the case may be, until the space is filled and packed, and then the apertures are plugged with plugs.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A converging-diverging rocket nozzle comprising an inner annular gas-tight wall of a heat-resistant material which is shaped internally according to the requirements of nozzle design; an outer annular gas-tight wall joined to said inner wall so as to form an annular container, said container being gas-tight at the points of joinder of said walls and having apertures communicating with the exterior of said container through the walls thereof and a solid fusible and vaporizable material having a lower vaporization point than the melting point of said heat resistant material positioned in and substantially filling said container, said material being selected from the group consisting of boron, nickel, antimony trioxide, lithium fluoride, zinc, iron, alumina and silica.

2. The nozzle of claim 1 in which the annular inner wall has a plurality of apertures positioned upstream of the throat of the nozzle.

3. The nozzle of claim 1 in which the annular outer wall has a plurality of apertures.

4. The nozzle of claim 1 in which the said solid fusible and vaporizable material comprises two semi-annular pieces shaped to fit the contours of the container.

5. The nozzle of claim 1 in which the said solid fusible and vaporizable material is a powder.

6. An ablation-resistant rocket nozzle for use at elevated temperatures which comprises an inner annular gas-tight wall of an ablation-resistant material; an outer annular gas-tight wall of a heat-resistant material joined to said inner wall in such a manner as to form an annular container, said container being gas-tight at the points of joinder of said walls and having apertures communicating with the exterior of said container through the walls thereof; and a solid fusible and vaporizable refractory material having a lower vaporization point than the melting points of the wall materials positioned in and substantially filling said container, said material being selected from the group consisting of boron, nickel, antimony trioxide, lithium fluoride, zinc, iron, alumina and silica.

7. An ablation-resistant rocket nozzle for use at elevated temperatures which comprises an annular gas-tight inner wall of an ablation-resistant material; an outer annular gas-tight wall of a heat-resistant material joined to said inner wall in such a manner as to form an annular container, said container being gas-tight at the points of joinder of said walls and having apertures communicating with the exterior of said container through the walls thereof; and a solid fusible and vaporizable material positioned in and substantially filling said container, the material being characterized by a vaporization point lower than the melting points of the wall materials, and by high heat capacity, high melting point, and high heat of fusion with respect to its vaporization point, said material being selected from the group consisting of boron, nickel, antimony trioxide, lithium fluoride, zinc, iron, alumina and silica.

8. An ablation-resistant rocket nozzle for use at elevated temperatures which comprises an annular gas-tight inner wall of tungsten; an annular gas-tight outer wall of molybdenum joined to said inner wall in such a manner that an annular container is thereby formed, said container being gas-tight at the points of joinder of said walls and having apertures communicating with the exterior of said container through the walls of said container; and boron positioned in and substantially filling said container.

References Cited in the file of this patent
UNITED STATES PATENTS

| | | |
|---|---|---|
| 2,354,151 | Skoglund | July 18, 1944 |
| 2,407,164 | Kimball | Sept. 3, 1946 |
| 2,574,190 | New | Nov. 6, 1951 |
| 2,770,097 | Walker | Nov. 13, 1956 |
| 2,779,281 | Maurice et al. | Jan. 29, 1957 |
| 2,922,291 | Fox et al. | Jan. 26, 1960 |
| 2,948,115 | Dunsworth et al. | Aug. 9, 1960 |
| 2,962,221 | Kunz | Nov. 29, 1960 |
| 2,992,960 | Leeg et al. | July 18, 1961 |
| 3,014,353 | Scully et al. | Dec. 26, 1961 |
| 3,022,190 | Feldman | Feb. 20, 1962 |
| 3,026,806 | Runton et al. | Mar. 27, 1962 |
| 3,048,972 | Barlow | Aug. 14, 1962 |

FOREIGN PATENTS

| | | |
|---|---|---|
| 1,003,758 | France | Nov. 21, 1951 |
| 1,108,090 | France | Aug. 17, 1955 |
| 1,153,115 | France | Sept. 23, 1957 |

OTHER REFERENCES

American Rocket Society Journal, vol. 29, No. 9, September 1959, pages 670–672.